(12) United States Patent
Mazinani et al.

(10) Patent No.: US 7,986,834 B2
(45) Date of Patent: Jul. 26, 2011

(54) METHOD AND APPARATUS FOR COLOR IMAGE CORRECTION

(75) Inventors: Amir Mazinani, Toronto (CA); Monica Man Kay Tang, Markham (CA)

(73) Assignee: Zoran Corporation, Sunnyvale, CA (US)

( * ) Notice: Subject to any disclaimer, the term of this patent is extended or adjusted under 35 U.S.C. 154(b) by 983 days.

(21) Appl. No.: 11/557,811

(22) Filed: Nov. 8, 2006

(65) Prior Publication Data

US 2008/0107333 A1 May 8, 2008

(51) Int. Cl.
G06K 9/00 (2006.01)
G06K 9/40 (2006.01)

(52) U.S. Cl. ......... 382/167; 382/162; 382/254; 382/274

(58) Field of Classification Search .................. 382/167, 382/254
See application file for complete search history.

(56) References Cited

U.S. PATENT DOCUMENTS

| | | | |
|---|---|---|---|
| 6,069,982 A * | 5/2000 | Reuman | 382/275 |
| 6,885,482 B1 | 4/2005 | Kubo et al. | |
| 6,941,028 B2 | 9/2005 | Kimmel et al. | |
| 7,369,699 B1 * | 5/2008 | Christie | 382/163 |
| 2003/0030826 A1 * | 2/2003 | Kimmel et al. | 358/1.9 |
| 2003/0138161 A1 | 7/2003 | Rising, III | |
| 2004/0091164 A1 | 5/2004 | Sakatani et al. | |
| 2005/0073702 A1 | 4/2005 | Shaked et al. | |
| 2005/0074163 A1 | 4/2005 | Shaked | |

FOREIGN PATENT DOCUMENTS

WO 2004051569 6/2004

OTHER PUBLICATIONS

Rahman, Z., Jobson, D.J., Woodell, G.A., "Multi-scale retinex for color image enhancement", Proceedings of International Conference on Image Processing, 1996. vol. 3, pp. 1003-1006.*
Meylan et al. "High dynamic range image rendering with a Retinex-based adaptive filter", IEEE Transactions on Image Processing, vol. 15, No. 9, Sep. 2006, pp. 2820-2830.*
Tao et al. "Modified luminance based MSR for fast and efficient Image enhancement," IEEE. Intl. Workshop on Applied Imagery and Pattern Recognition, AIPR—2003.*
International Search Report cited in a corresponding International Application No. PCT/US2007/084104 mailed Apr. 24, 2008.
Funt, et al, "Luminance-Based Multi-Scale Retinex," To appear: Proceedings AIC Colour 97 Kyoto 8th Congress of the International Association, May 1997.
Barnard, et al, "Investigations Into Multi-Scale Retinex," Colour Imaging in Multimedia '98, Derby UK, Mar. 1998, pp. 9-17.
Marini, et al, "Multi-Resolution Retinex: Comparison of Algorithms," International Conference on Color in Graphics and Image Processing—CGIP '2000.
Marini, et al, "A computational approach to color adaptation effects," Image and Vision Computing 18 (2000), pp. 1005-1014.

* cited by examiner

*Primary Examiner* — Samir A Ahmed
*Assistant Examiner* — Li Liu
(74) *Attorney, Agent, or Firm* — Lando & Anastasi, LLP

(57) ABSTRACT

A method and apparatus of image processing is disclosed. The method and apparatus accomplish image processing by separating a luma component and a chroma component of an image signal. Averaging of at least some of the image pixels of the luma component is done over a plurality of image pixels to provide a plurality of surround function values. Retinex-like processing of the luma component is done using the surround function values to provide a Retinex-like processed luma component. The Retinex-like processed luma component is added to the chroma component of the image signal to provide a processed image signal.

20 Claims, 7 Drawing Sheets

METHOD AND APPARATUS FOR COLOR IMAGE CORRECTION

BACKGROUND OF INVENTION

1. Field of Invention

Aspects of the present invention are directed to color image processing, and more particularly to modified Retinex image processing.

2. Discussion of Related Art

The quality provided by digital technologies has created a huge demand for digital products in general. Part of this digital revolution is the increased popularity of digital images. At the heart of this digital image revolution are image processing systems. These systems process the captured digital image to enhance the clarity and details of the image using sophisticated image processing algorithms. The use of these algorithms result in images that are substantially more accurate and detailed than previously achieved using older analog methods.

However, when compared to the direct observation of scenes, color images in general have two major limitations due to scene lighting conditions. First, the images captured and displayed by photographic and electronic cameras suffer from a comparative loss of detail and color in shadowed and highlighted zones. This is known as the dynamic range problem. Second, the images are subject to color distortions when the spectral distribution of the illuminant changes. This is known as the color constancy problem. A commonly encountered instance of the color constancy problem is the spectral difference of the same scene illuminated by daylight and artificial light, for example, by tungsten light, which will result in different shading.

The human visual system is typically able to adapt to lighting variations across scenes, visualizing details in regions over a very wide range of illuminations. Most image recording systems, however, fail to be able to tolerate such a wide range in lighting variation, and therefore cannot accurately capture the full dynamic range of the scene. As a result, images produced by these image recording systems are often of poor quality, compared to images produced by human perception. Another task that is often poorly performed by the image recording systems is that of color constancy. Humans perceive color in a way that is fairly independent of scene illumination, whereas the image recording systems are strongly influenced by spectral shifts.

The above problems can be stated mathematically by describing a relationship between an acquired image S, a reflectance of objects of the image R, and an illumination L in a pixel-wise multiplication, or:

$$S = R \times L \quad \text{Equation (1)}$$

This expression means that at each point in the image S, the color value is the multiplication of the reflectance value by the illumination value. Given an image S, the problem to be solved is removal of the effects of illumination and recovery of the reflectance image. That is, given S, find both R and L. However, calculation of both R and L is typically not possible. The challenge then, is to generate a methodology that can estimate R and L.

In the field of image processing, a center/surround Retinex process has been developed in which functions of the retina and cortex are substantially modeled. The term Retinex is coined from mixing the words retina and cortex, since both play an important role in the vision process.

Retinex processing deals with correcting image information for illumination in the images. The visual sensation is modeled and surrounding information with respect to a center pixel is taken into consideration. Collectively this is referred to as "Retinex Processing.". The goal of the Retinex theory is to decompose a given image S into the reflectance image R, and the illumination image L, such that at each point (x,y) in the image domain, $S(x,y)$ equals the product of $R(x,y)$ and $L(x,y)$. The benefits of such decomposition include the possibility of removing illumination effects of back/front lighting, enhancing photographs and other image capture methods that include spatially varying illumination, such as images that contain indoor and outdoor zones, and correcting colors in images by removing illumination-induced color shifts.

As noted above, recovering the illumination L from a given image S is known to be a mathematically ill-posed problem, and known algorithms vary in the manner and effectiveness of overcoming this limitation. The Retinex approach provides the framework for one such method. The Retinex methodology was motivated by Edward Land's research of the human visual system, which is described in R. H. Land, "The Retinex Theory of Color Vision," Sci. Amer., Vol. 237, pp. 108-128 (1977).

The first Retinex algorithms were of the random walk type. Subsequent Retinex algorithms used homomorphic filtering. Homomorphic filtering is a generalized technique for image enhancement. It simultaneously normalizes the brightness across an image and increases contrast. Since illumination and reflectance are not separable, but their approximate locations in the frequency domain may be located, homomorphic filtering separates the components by processing the natural logarithm of the image in the frequency domain. To make the illumination of an image more even, the high-frequency components are increased and low-frequency components are decreased because the high-frequency components are assumed to be the reflectance in the scene (the amount of light reflected off the object in the scene), whereas the low-frequency components are assumed the illumination in the scene. Filtering is used to separate and repress low frequencies, which is assumed to be the illumination component, and high pass filtering is used to amplify high frequencies, which is assumed the surface reflection component.

The application of Land's human vision theories to image processing has been attempted in the prior art. Central to the prior art Retinex methods is the Retinex-type algorithm, discussed above with respect to Equation (1), namely that a perceived image S is the multiplication between the illumination L shed on visible surfaces and the respective reflectance R of the surfaces. An underlying assumption behind Retinex algorithms is that the illumination L is an artifact. The illumination L is estimated and either removed completely, or partially. Estimating L from S is the main algorithmic and computational problem in Retinex algorithms.

Prior art Retinex-type algorithms are characterized by a two-module structure as shown in FIG. 1. An illumination estimation module 10 computes a smooth version L (i.e., the local statistics) of an input image S. Usually the smooth version L is a either a linear or a non-linear low-pass filter of the input image S. A manipulation module 20 then manipulates pixels in image S according to correspondingly determined values of L. In the case of Retinex-type algorithms, the L is usually a local average or local envelope (maximum) of S. Sometimes the L may be a robust local average or robust local envelope of S, whereby robust means that pixels participating in determining the local average or envelope are on the same side of perceptually significant image edges as the center pixel.

In FIG. 1, for convenience, the input image S is shown as the input to the Retinex algorithm. However, as is known to those of ordinary skill in the art, Retinex-type algorithms typically operate in the Log domain. As is also know to those of ordinary skill in the art, the illumination L is often referred to as an "envelope." The envelope can be smooth or piece-wise smooth.

Prior art Retinex algorithms also typically use linear space invariant low pass filters or partial differential equations for the illumination estimation module 10. Variants include slowly varying envelopes, i.e., local envelopes instead of local averages, and robust low passes resulting in piece-wise smooth averages or envelopes, which might change abruptly whenever the input changes abruptly.

In the illumination manipulation module 20 module, the illumination L might be subtracted in part, for example, subtract half of the illumination L from the input image S. Alternative manipulation methods may reduce more of the input image S values as corresponding illumination L values increase.

Prior art Retinex algorithms may be applied to monochrome or color images. In the color image case, the Retinex algorithm may be applied to all planes, e.g. the three color planes that comprise the input image signal.

In some prior art Retinex algorithms both the illumination estimation and illumination manipulation modules 10 and 20 are performed in an iterative filtering and subtraction scheme. In other prior art Retinex algorithms, the modules 10 and 20 are interleaved.

In an improved prior art Retinex-type algorithm, as disclosed in published U.S. application Publication No. 2005/0074163A1 the illumination L' is obtained from a sub-sampled version S' of the input image S. Such an improved Retinex-type algorithm is shown in block diagram form in FIG. 2. In FIG. 2, the Retinex-type algorithm includes linear illumination estimation module 30 and the illumination manipulation module 20, as discussed with respect to FIG. 1. The image signal S is first input to a down sample module 32, where the image signal S is sub-sampled using techniques known to those of ordinary skill in the art to produce sub-sampled images S'. For example, the sub-sampling may involve averaging blocks of four pixels in the image S. The linear illumination estimation module 30 then generates an estimate of the illumination L' based on the sub-sampled image S'. The estimate of the illumination L' is then provided to an up-sample module 34, and an estimation of the illumination L" of the entire image S is produced, using interpolation and similar techniques known to those of ordinary skill in the art. The estimate of the illumination of the entire image L" is then operated on as discussed above with respect to FIG. 1 to provide an estimate of the reflectance R of the entire image.

The sub-sampling and subsequent interpolation as discussed with respect to FIG. 2. are intended to speed up the computationally intensive Retinex process. However, in the Retinex-type algorithm illustrated in FIG. 2, the interpolation is performed on a set of smooth, low resolution intermediate images (i.e., the images S'), using the high resolution input image S to select corresponding output pixels from the resulting set of high resolution images L". Furthermore, the computationally intensive operation of the Retinex-type algorithm is repeated several times, once for each of the intermediate images S', e.g. for the three color planes that comprise the input image signal.

SUMMARY OF INVENTION

Accordingly, it is an object of the present invention to provide a modified Retinex-like device and method for processing an image.

According to one embodiment of the invention, a method for processing an image signal comprises separating a luma component and a chroma component of an image signal to provide the luma component and the chroma component. The method also comprises performing Retinex-like processing of only the luma component using surround function values to provide a Retinex-like processed luma component, and adding the Retinex-like processed luma component to the chroma component of the image signal to provide a processed image signal.

One aspect of this embodiment additionally comprises averaging at least some of the image pixels of the luma component over a plurality of image pixels to provide a plurality of surround function values.

According to another embodiment of the invention, an apparatus for image processing comprises a separation module that separates a luma component and a chroma component of an image signal to provide the luma component and the chroma component. In addition, the apparatus comprises a Retinex-like processing module that performs a Retinex-like process with the surround function values to provide a Retinex-like processed luma component, and a summing module that adds the Retinex-like processed luma component to the chroma component to provide a processed image signal.

One aspect of this embodiment also comprises an averaging module that averages the luma component over a plurality of image pixels to provide a plurality of surround function values.

According to another embodiment of the invention a processor readable medium is configured with instructions operable to cause the processor to separate a luma component and a chroma component from the image signal to provide the luma component and the chroma component. In addition, the processor is configured to perform Retinex-like processing using the surround function values to provide a Retinex-like processed luma component, and to add the Retinex-like processed luma component to the chroma component of the image signal to provide a processed image signal.

One aspect of this embodiment also comprises instructions operable to cause the processor to average at least some of the image pixels of the luma component over a plurality of image pixels to provide surround function values.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
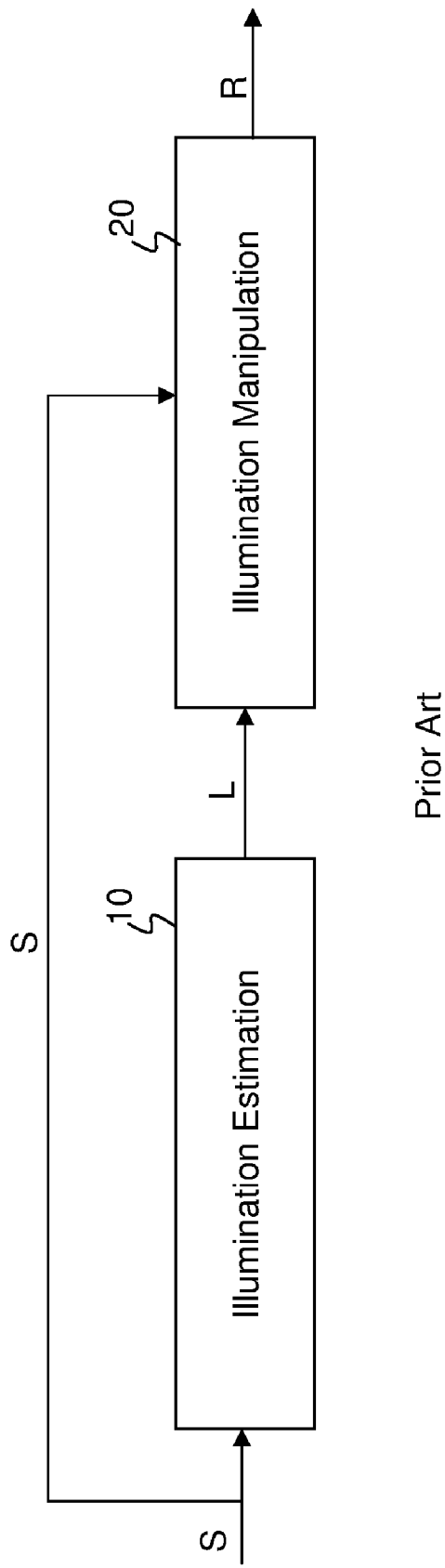
FIGS. 1 and 2 are block diagrams of prior art Retinex-type algorithms.
Figure 2:
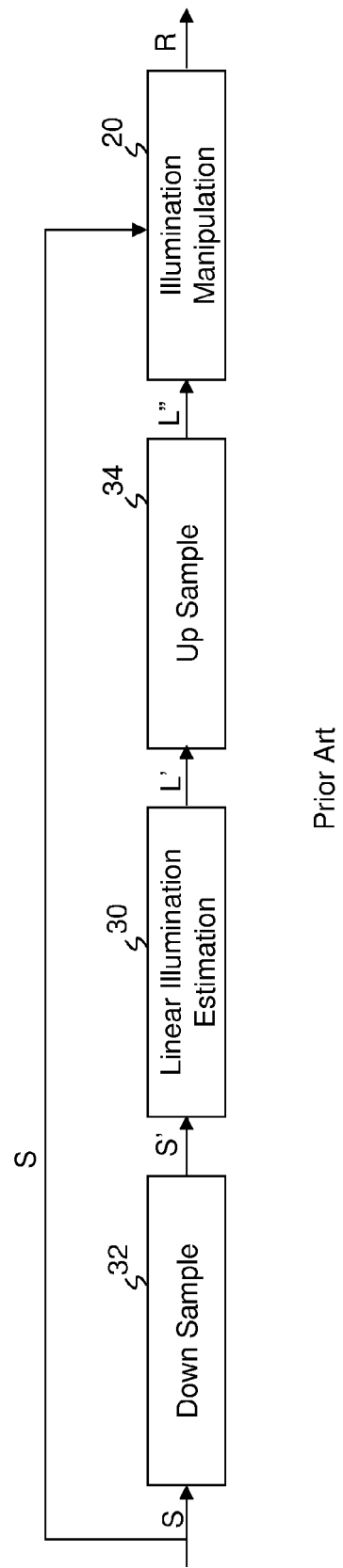

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As used herein, the term "data" refers to physical signals that indicate or include information. The term "data" includes data existing in any physical form, and includes data that are transitory or are being stored or transmitted. For example, data may exist as electromagnetic or other transmitted signals or as signals stored in electronic, magnetic, or other form.

As used herein, the term image signal refers to any image signal including, for example, a composite video signal which has luma and chroma components, according to any format used in the industry, as well as any other digital image signal.

As used herein, the term separator refers to a device or a process for separating components of an image signal, for example, luma and chroma components of a composite video signal.

As used herein, a memory is a physical medium that can store data. Examples of a memory include magnetic media devices such as diskettes, floppy disks, and tapes, optical media such as magneto-optic disks, CDs, CDRs, DVDs, and semi-conductor media such as semi-conductor ROMs, RAMs, and the like.

In broad over view, various embodiments of the invention permit the processing of an image signal to provide a Retinex-like processed image signal to mimic the dynamic range accommodation of human vision. More specifically, according to some embodiments of the invention, the luma component of an incoming video signal is separated from the chroma component of an incoming video signal, and a multi-scale Retinex-like process is performed on only the luma portion of the video signal. According to such embodiments, the chroma portion of the incoming image signal is added back to the multi-scale Retinex-like processed luma portion of the incoming image signal to provide the output image signal.

According to such embodiments, there is avoided any shift in image tint, which is a common side effect of prior art multi-scale Retinex processing techniques. In addition, another advantage of such embodiments of the inventions is that there is provided a device and process which is more efficient in that it uses significantly lower computational complexity than traditional Retinex processing devices and techniques. In particular, as has been discussed above, traditional Retinex techniques are done a pixel-by-pixel basis. For example, with multiple filters of different size windows surrounding each pixel being processed, in order to derive surround function values that are used in the overall multi-scale Retinex process, to enhance the dynamic range of the image. In contrast, embodiments of invention simplify the computational complexity thereby reducing processor resource requirements, thereby resulting in a significant lowering of IC power consumption, silicon usage and thus cost.

In addition, according to some embodiments of the invention, a multi-scale Retinex-like process and device comprises an averaging process and device which averages a pixel being processed, for example, over multiple size windows of the incoming image signal, to directly provide surround function values of the multi-scale Retinex-like process, thereby reducing processing requirements and facilitating the multi-scale Retinex-like process to be implemented on an incoming image signal. This is in contrast to the complex Gaussian filtering that occurs according to the prior art Retinex processing that has been described above.

Figure 3:
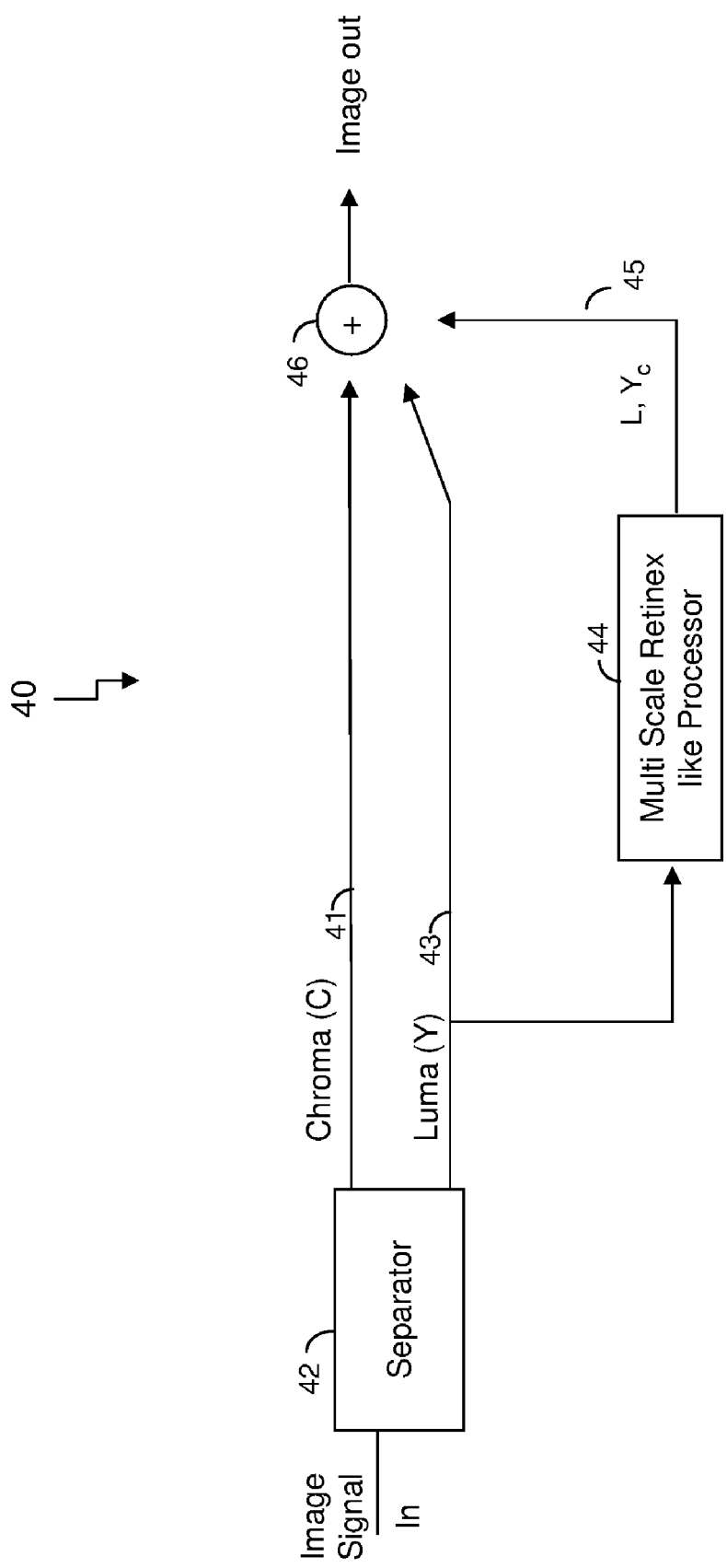
FIG. 3 illustrates one embodiment of an image processor according to the invention.
Figure 4:
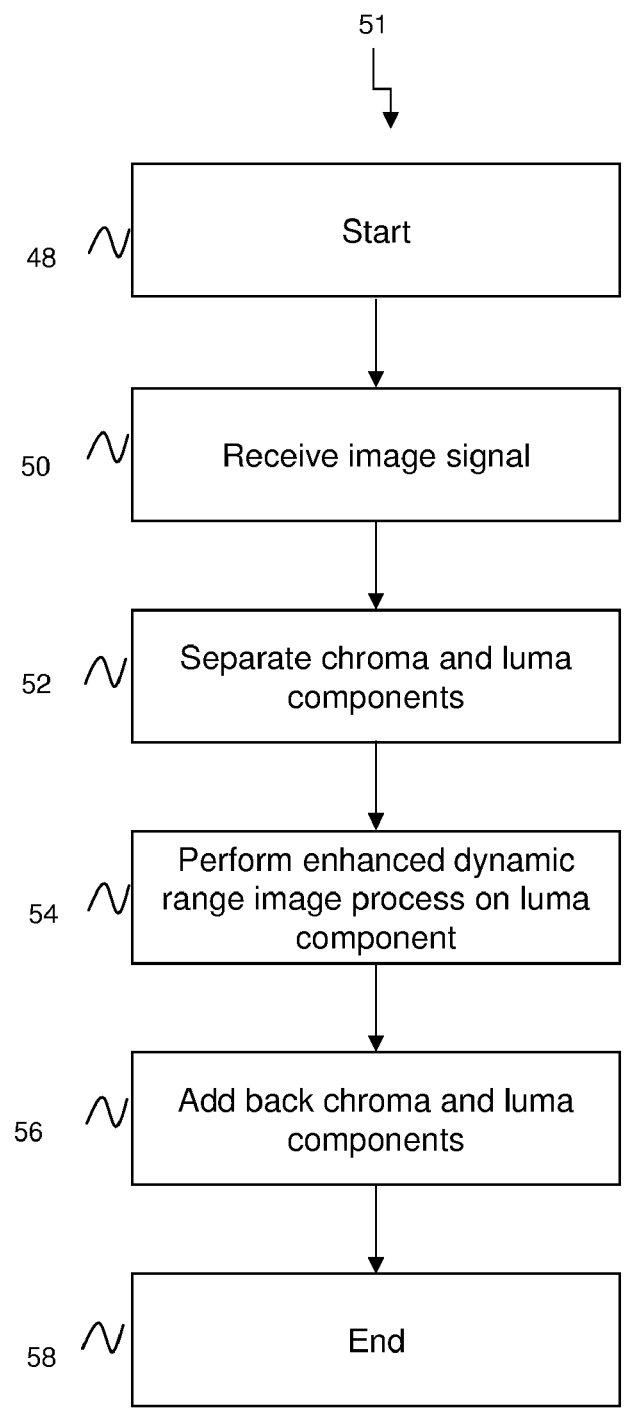
FIG. 4 illustrates one embodiment of a method of image processing according to the invention.

Referring now to FIG. 3, there is illustrated one embodiment of a process and device 40 that implements a multi-scale Retinex-like process 51, as illustrated in FIG. 4, according to some embodiments of the invention. In particular, referring to both FIGS. 3 and 4, some embodiments of the multi-scale Retinex-like process begin (at step 48) by receiving an input image signals (at step 50) at a separator device 42 as illustrated in FIG. 3. The separator device, employing Luma and Chroma separation techniques that are well known to one skilled in the art, then operates on the input image signal to separate the chroma component (C) of the input image signal from the luma component (Y) of the input image signal (step 52) to provide the chroma component (C) of the image signal on line 41 and the luma component (Y) of the image signal on line 43. The luma component is directed in two separate paths as shown in FIG. 3. In the lower path, the Luma signal is entirely operated on by the Multi Scale Retinex Like Processor 44. In the upper path, the Luma signal progresses unprocessed to the adder 46, where the Multi Scale Retinex liked processed lower path Luma signal is added back to the unprocessed chroma component, and the unprocessed Luma component. In the lower path, the Luma component is operated on by a multi-scale Retinex-like processor 44 as illustrated in FIG. 3 to perform enhanced dynamic range image processing on the luma component (step 54) to provide multi-scale Retinex-like surround function values $F_n(i, j)$ that are used in the multi-scale Retinex algorithm of equation (2):

$$Y_c(i, j) = \sum_{n=1}^{N} W_n \cdot \{\log[I_c(i, j)] - \log[I_c(i, j) * F_n(i, j)]\}$$

Equation (2)

The multi-scale Retinex-like processor 44 provides the surround function values $F_n(i, j)$. The surround function values are values used for producing a blurred image in view of pixels surrounding the center pixel. The surround function values are used in the multi-scale Retinex equation (2) to provide the pixel value after Retinex processing or in other words, an enhanced dynamic range image signal $Y_c(i, j)$. It is to be appreciated that Equation (2) describes the multi-scale Retinex algorithm, where c represents the three color bands of the image signal, * represents a convolution integral, • represents a multiplication, i and j represent the X-Y coordinates of a pixel in the image signal, N is the number of scales being used, $W_n$ are the weighting factors for the scales, I(i, j) is the original pixel value, and $F_n(i, j)$ are the surround function values, which according to some embodiments of the invention are provided as described herein.

Referring to FIGS. 3 and 4, the output of the multi-scale Retinex processor 44 $Y_c(i, j)$, which is an estimate of the Luminosity of the luma component, is provided on line 45 to summing device 46, and the chroma component on line 41 and the luma component on line 43 is added with the Retinex-like processed signal provided on line 45 (step 56), to provide the output image signal and to complete the Retinex-like process (step 58) according to some embodiments of the invention. The estimate of Luminosity, L, in Equation (1), is not, a substitute for the luma (the black and white component) of the image signal. As previously stated L "Luminosity" is a measure of the illumination falling on the objects of the scene being imaged. Therefore, in order for Retinex Equation 2 to be effected, L is used for the calculation of $F_n(i, j)$, luma, for the calculation of log [$I_c$(i, j)] and chroma, also for the calculation of log [$I_c$(i, j)]. It is to be appreciated that with such embodiments of the invention, the color portion of the incoming image signal is not processed or modified by the Retinex-like process, and therefore any shift in image tint, which is a common side effect of prior art multi-scale Retinex processing, is avoided. In addition, another advantage of some embodiments of the invention is that the apparatus and method are operating on only the luma portion of the image signal, instead of operating on the separate R, G, B components of the image signal, thereby providing overall savings in processing by, for example, two-thirds from the traditional Retinex processing techniques. Accordingly, there can be realized a reduction in silicon and overall memory resources according to such embodiments of the invention.

Figure 5:
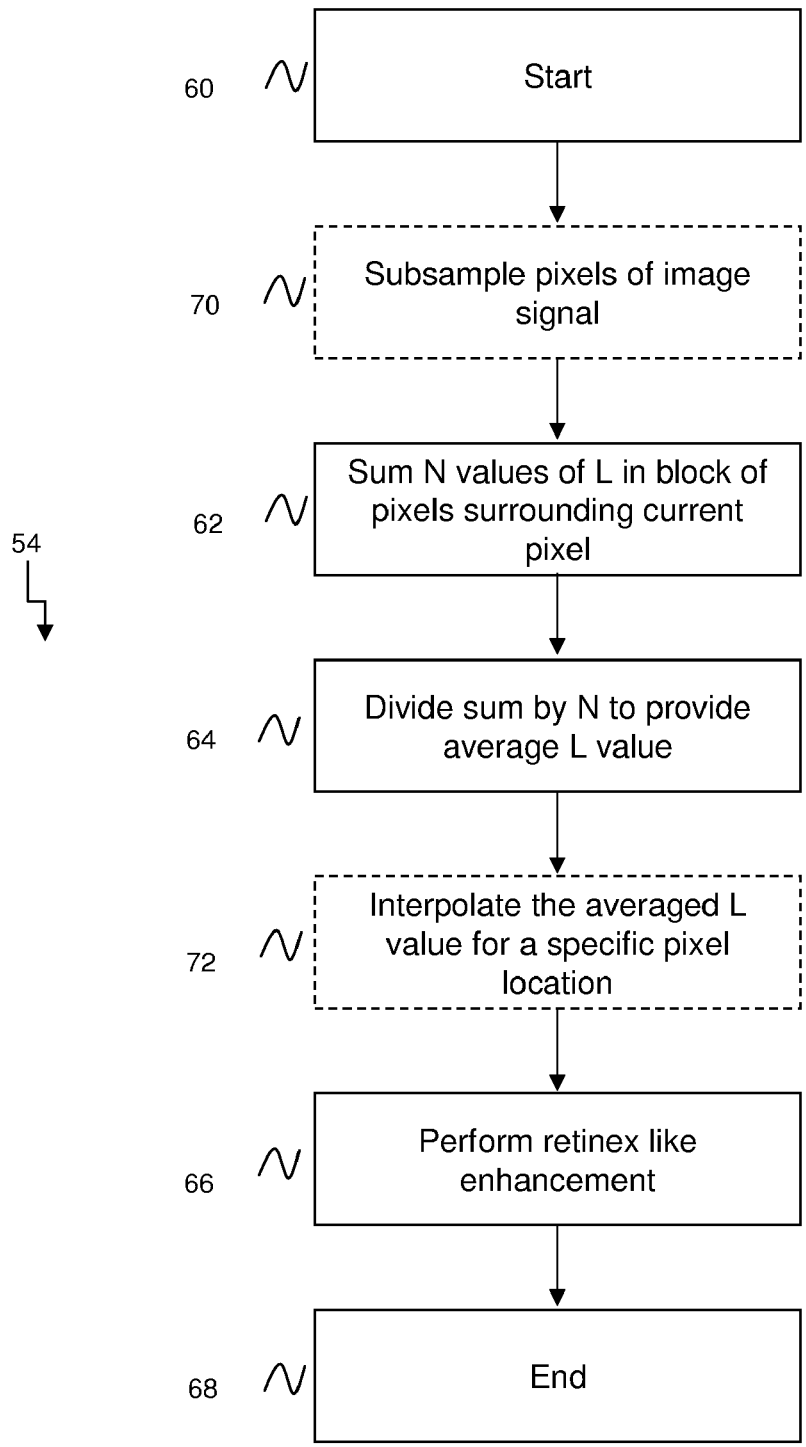
FIG. 5 illustrates another embodiment of a method of image processing according to the invention.

Referring now to FIG. 5 there is illustrated one embodiment of the multi-scale Retinex-like process 54 that can be executed by the multi-scale Retinex-like processor 44 as has been described herein with reference to FIGS. 3 and 4. In some embodiments of the invention, the luminosity of an image signal (L) is extracted from the luma component (Y) of the image signal by averaging the luma component (Y) over equal or varying sized blocks of image pixels. In particular, for such embodiments, the process 54 begins at step 60, wherein the process sums N values of pixels in a block of image pixels at step 62, and divides the sum result by the number of pixels N to provide the average luminosity value (L) for the block. It is to be appreciated that varying sized blocks of image pixels can be used, such as blocks of 128×128 pixels, 64×64 pixels, and 16×16 pixels, to determine an average luminosity value. These average luminosity values of the luma component for each block are then used as the surround function value $F_n$(i, j) in equation (2) discussed above to perform Retinex-like enhancement on the image signal (step 66), which completes the process (step 68) according some embodiments of the invention. It is to be appreciated that for such embodiments, there is provided a multi-scale Retinex-like result, which is not a true multi-scale Retinex process of an image signal according to the prior art. In particular, according to the prior art, as has been discussed above, the calculation resources and energy needed to extract the luminosity from the image signal is typically done with a Gaussian filter, or some other complex filtering methodology, on each pixel of the image signal. However, one distinction and advantage of some embodiments of the invention is that the multi-scale, Retinex-like algorithm is performed on only the luma information (the black and white information) of the image signal, and not on the full color combination of three color planes (R, G, B) which comprise the input image signal or not on each color plane of the image input signal, as is done by the prior art.

Thus, according to some embodiments of the invention, a method of image processing an image signal comprises separating the luma component of the image signal and the chroma component of the image signal from the image signal to provide the luma component and the chroma component at an output, averaging the image pixels of the luma component over a plurality of image pixels to provide a plurality of surround function values of the luma component and performing Retinex-like processing of the luma component using the surround function values to provide a Retinex-like processed luma component. According to such embodiments the Retinex-like processed luma component and the unprocessed luma component are then added to the chroma component to provide a processed image signal.

In addition, according to some embodiments of the invention, an apparatus for image processing an image signal comprises a separation module that separates the luma component and the chroma component of an image signal to provide the separate luma component and the separate chroma component. The apparatus also includes an averaging module that averages the luma component over a plurality of image pixels to provide a plurality of surround function values, and a Retinex-like processing module that performs a Retinex-like process with the surround function values to provide a Retinex-like processed luma component. According to such embodiments, the apparatus also comprises a summing device that adds the chroma component of the image signal to the Retinex-like processed luma component and the unprocessed luma component, to provide the processed image signal.

It is to be appreciated that according to some embodiments a processor, in the form of an integrated circuit, or a general purpose microprocessor, such as an Intel Pentium, can be programmed to perform the steps of separating the luma component and the chroma component from an input image signal to provide the luma component and the chroma component, to average the pixels of the luma component over a plurality of image pixels to provide the surround function values, and to perform the Retinex-like processing using the surround function values to provide the Retinex-like processed luma component. Also, a fixed function, non-programmable, hardware implementation can be employed. In addition, it is to be appreciated that, if desired, the processor can be configured to add the chroma component of the image signal to the Retinex-like processed luma component to provide the processed image signal.

Note that as used herein, the term Retinex-like processing comprises any type of averaging of the luma component such as the averaging that has been described herein, as well as weighted averaging, linear averaging, non-linear averaging or any other averaging known to those of skill in the art, to provide the surround function values $F_n$(i, j). In addition, it is to be understood that Retinex-like processing also comprises implementing the multi-scale Retinex process of Equation (2), with the surround function values as described herein.

Referring again to FIG. 5, there is illustrated another embodiment of a Retinex-like process 54' that can be done with the multi-scale Retinex-like processor 44 of FIG. 3, according to some embodiments of the invention. In such embodiments, additional acts 70 and 72 can be included in the process. It is to be understood that other acts of this embodiment of the process 54' are substantially the same as has been described above with respect to FIG. 5 and therefore for the sake of simplicity, a description of these acts will not be repeated.

According to this embodiment, averaging of the luma component can be done on a sub-sampled block of pixels to further reduce the computational resources used by the processor of the invention. It is to be appreciated that although this embodiment describes further sub sampling of the luma component, the further sub sampling need not be part of the process and that the separation of the image signal into the luma and chroma components without the further sub sampling provides the advantages described herein, without the need to further sub-sample the image signal.

Figure 6:
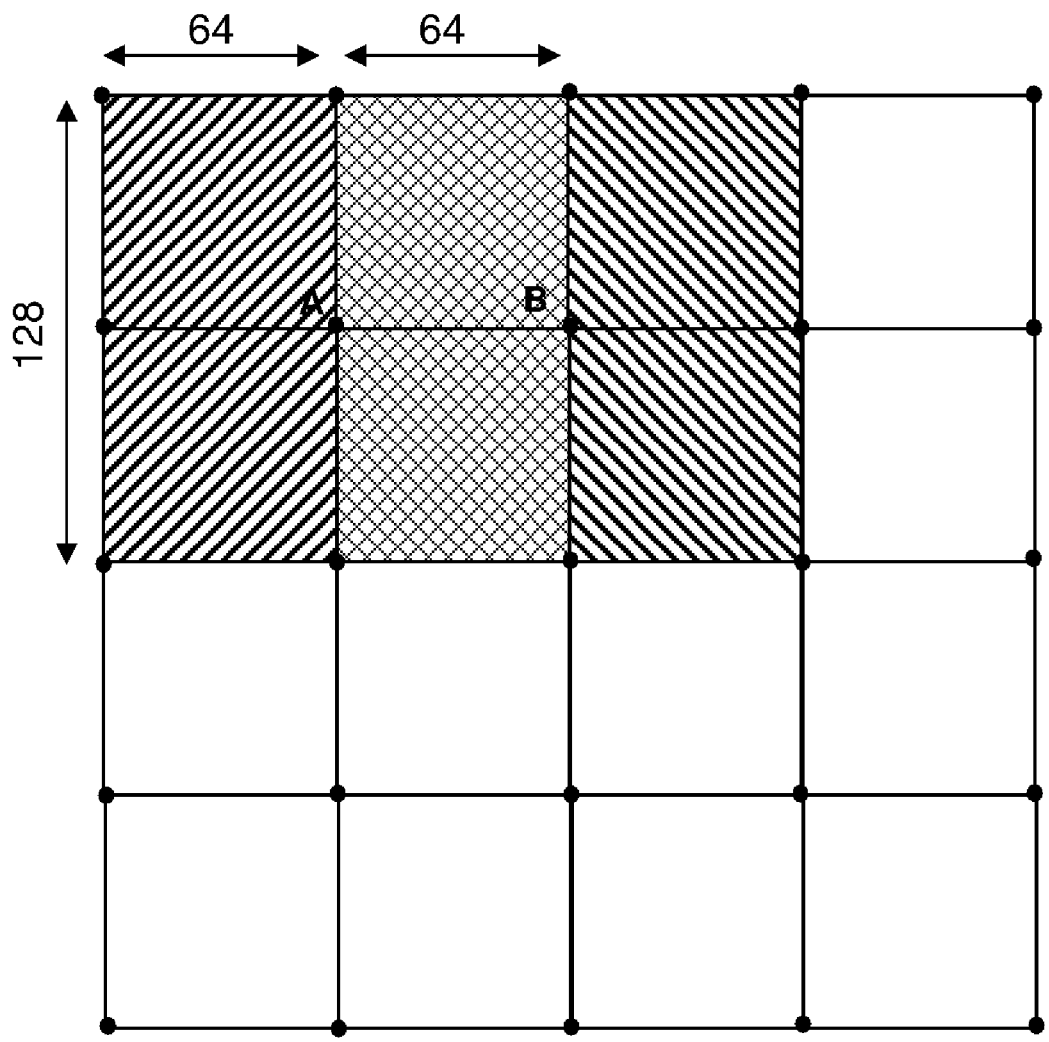
FIG. 6 illustrates a down sampling and averaging process of a luma component of an image, according to some embodiments of the invention.
Figure 7:
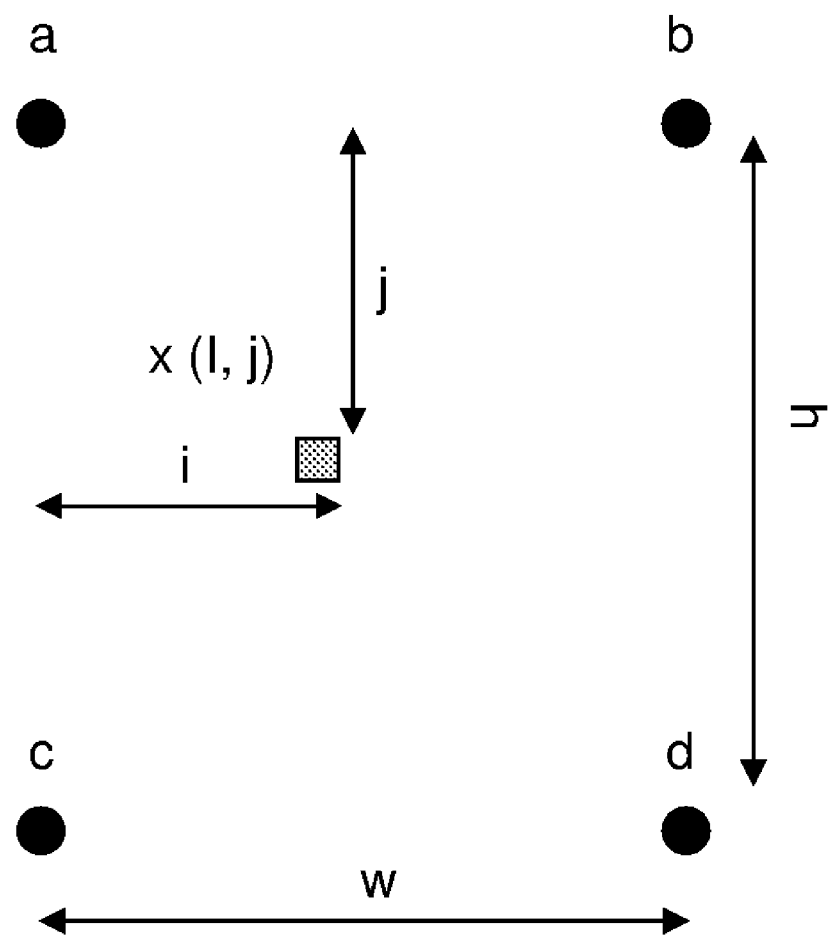
FIG. 7 illustrates an interpolation process of a surround function values for a pixel of a luma component of an image, according to some embodiments of the invention.

Referring now to FIGS. 6 and 7 in conjunction with FIG. 5 to describe additional embodiments of the invention. According to these embodiments, the process 54' down samples or sub-samples the pixels of the luma component of the image signals at act 70 (see FIG. 5) to provide sub-sample luma components of the image signal and performs averaging on the sub-sampled luma components to provide an average output for specific pixel locations.

Referring to FIG. 6, there is illustrated one example of a sub-sampling and averaging process that can be implemented according to some embodiments of the invention. By way of example, assuming that averaging is to be done on a 128×128 window of pixels, the averaging can be applied to every 64$^{th}$ pixel on every 64$^{th}$ line of the input image signal as represented by points A, B of FIG. 6. In particular, at pixel A, averaging is performed with a surrounding 128×128 window, depicted in FIG. 6 with diagonal stripes from top right to bottom left of the 128×128 box surrounding pixel A. Similarly, for pixel B, averaging can be done with the surrounding 128×128 window of pixels depicted in FIG. 6 with diagonal stripes from top left to bottom right. Accordingly, it can be seen from FIG. 6 that half of the two 128×128 squares are overlapping each other for the two 128×128 windows that are averaged for the down sampled pixels A, B. Thus, averaging of down sampled points is performed by some embodiments of the invention. It is to be appreciated that, as has been discussed above, other window sizes as well as other pixel/line down sampling points can be used, depending upon the desired reduction in computational complexity and the resulting effects of the overall Retinex-like processed image. It is also to be fully understood that averaging over any size window of certain points can be done without sub or down sampling of the image signal. Accordingly, the amount of computation associated with the down sampling, as well as with the averaging of the pixels over various block sizes, can be chosen according to some embodiments of the invention, to further customize the reduction in processing complexity and resources. It is to be recognized that according to some embodiments, the apparatus and process can be configured so that a user can select the down sampling ratios and window sizes to accomplish the desired effects on the input image signal.

For such embodiments, the averaged luma value can also be interpolated to determine the average luminous value for a particular pixel location, according to some embodiments of the invention. In particular, referring to FIG. 7, there is illustrated one example of an interpolation process that can be accomplished at step 72 (see FIG. 5) to interpolate the average luma value for a particular pixel location between averaged pixel locations. In particular, as illustrated in FIG. 7, point a, b, c and d represent averaged output luma values from the process described herein. In addition, point x (i, j) represents a location where the averaged output luma values are to be interpolated according to the invention. According to some embodiments, interpolation can be done to approximate the averaged luma value L at x (i, j) using the height between the down sampled values, h, and the width between the down sampled values, w, and the distance i, j, between point x and averaged values a, b, c, and d. This distance can be used to interpolate the average luma value x at point i, j as is known to those of skill in the art. Note that although one embodiment of an interpolation process has been described herein that other embodiments such as linear, non-linear, mathematical, lookup tables, as well as other interpolation techniques known to those of skill in the art can also be used.

As has been described herein, the down sampled and averaged and subsequently interpolated value of the luma component L, can be used as a surround function value, $F_n(i, j)$ in equation (2), to determine the Retinex-like processed luma component $Y_c(i, j)$ of the image signal.

Thus according to some embodiments of the invention, a method of image signal processing comprises separating the luma component and the chroma component from the input image signal to provide the luma component and the chroma component, down sampling the luma component of the image signal to a down sampled set of image pixels of the luma component, and averaging the down sampled set of image pixels of the luma component over a plurality of image pixels to provide a plurality of surround function values. In addition, such embodiments further comprise interpolating the average surround function values to provide interpolated surround function values for pixels of the luma component, and performing Retinex-like processing of the luma component using the average surround function values and the interpolated surround function values to provide a Retinex-like processed luma component. In addition, such embodiments also comprise adding the chroma component of the image signal to the Retinex-like processed luma component of the image signal to provide a processed image signal.

According to some embodiments of the invention, the method of image processing can also comprise interpolating based on the height between two down sampled image pixels.

According to some embodiments of the invention, the method of image processing can also comprise interpolating based on the width between two down sampled image pixels.

According to some embodiments of the invention, the method of image processing can also comprise interpolating based on the distance between the pixel value and four surrounding down sampled image pixel values.

In addition, according to such embodiments, an apparatus for image processing an image signal comprises a separation module that separates the luma component and the chroma component from the image signal to provide the luma component and the chroma component, a down sampling module that samples the luma component of the image signal to provide a down sampled set of image pixels of the luma component, and an averaging module that averages the down sampled set of image pixels of the luma component over a plurality of image pixels to provide a plurality of averaged surround function values. In addition, such embodiments include an interpolating module that interpolates the averaged surround function values to provide interpolated surround function values for pixels of the luma component, and a Retinex-like processing module that performs a Retinex-like process with the averaged and interpolated surround function values to provide a Retinex-like processed luma component. Further, such embodiments comprise a summing module that adds the chroma component of the image signal to the Retinex-like processed luma component of the image signal to provide a processed image signal.

According to some embodiments of the invention, the interpolation module is configured to interpolate based on the height between two down sampled image pixels.

According to some embodiments of the invention, the interpolation module is configured to interpolate based on the width between two down sampled image pixels.

According to some embodiments of the invention, the interpolation module is configured to interpolate based on the distance between the particular pixel and four surrounding down sampled image pixels.

It is to be appreciated that according to such embodiments of the invention that a processor can be programmed to accomplish the acts of separating the luma component and the chroma component from the image signal to provide the luma component and the chroma component, to cause the processor to down sample the luma component of the image signal to provide down sampled image pixels of the luma component, and to average the down sampled image pixels of the luma component of a plurality of image pixels to provide averaged surround function values. In addition, the processor can be programmed to interpolate the average surround function values to provide interpolated surround function values for pixels of the luma component, and to perform the Retinex-like processing using the averaged and/or interpolated surround function values to provide a Retinex-like processed luma component of the image signal. In addition, the processor can be further configured to add the chroma component of the image signal to the Retinex-like processed luma component to provide the processed image signal.

According to some embodiments of the invention, the processor can be configured with instructions operable to cause the processor to interpolate based on the height between two down sampled image pixels.

According to some embodiments of the invention, the processor can be configured with instructions operable to cause the processor to interpolate based on the width between two down sampled image pixels.

According to some embodiments of the invention, the processor can be configured with instructions operable to cause the processor to interpolate based on the distance between the pixel value and four surrounding down sampled image pixel values.

It is worthy of mention that each process as described herein can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks.

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

The processor optionally can be coupled to a computer or telecommunications network, for example, an Internet network, or an intranet network, using a network connection, through which the processor can receive information from the network, or might output information to the network in the course of performing the above-described steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical, optical, or magnetic signals capable of being stored, transferred, combined, compared, and otherwise manipulated. The operations described herein that form part of the invention are useful machine operations. The manipulations performed are often referred to in terms, such as, separating, averaging, interpolating, sampling, adding, producing, identifying, running, determining, comparing, executing, downloading, or detecting. It is sometimes convenient, principally for reasons of common usage, to refer to these electrical, optical, or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described herein. Nevertheless, it will be understood that various modifications may be made without departing from the spirit and scope of the invention. For example, the invention has been described with respect to still image signals but is equally applicable to motion image signals such as video signals. In addition, the invention is applicable to image signals provided by any of, for example, DVD recorders/players, HDTV sets, display monitors, digital cameras, portable, and handheld internet interconnected appliances that capture and display still and/or motion image data, to provide increased efficiency which can for example, extend battery life, reduce the size of the device, reduced memory size, and the like.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of image processing, comprising:
separating a luma component and a chroma component of an image signal to provide the luma component and the chroma component;
splitting the luma component of the image signal into first luma component and a second luma component;
performing Retinex-like processing of only the first luma component using surround function values to provide a Retinex-like processed first luma component; and
adding the Retinex-like processed first luma component and the second luma component, so that a resulting luma component can either be bigger or smaller than the luma component of the image signal, and adding the resulting luma component and the chroma component of the image signal to provide a processed image signal.

2. The method of claim 1, wherein at least some of the image pixels of the first luma component are averaged over a plurality of image pixels of the first luma component to provide a plurality of surround function values.

3. The method of claim 2, wherein the act of averaging comprises:
summing N values of the image pixels of the first luma component to provide a summed result; and
dividing the summed result by N to provide the average surround function values.

4. The method of claim 1, wherein the chroma component of the image signal is not modified.

5. The method of claim 2, wherein the act of averaging comprises averaging the image pixels over a block of image pixels of the first luma component.

6. The method of claim 5, wherein the act of averaging comprises averaging the image pixels over varying sized blocks of image pixels of the first luma component.

7. The method of claim 5, wherein the act of averaging the image pixels includes averaging the image pixels over a 128×128 sized block.

8. An apparatus for image processing comprising:
a separator device that separates a luma component and a chroma component of an image signal to provide the luma component and the chroma component and that splits the luma component of the image signal into first luma component and a second luma component;
a Retinex-like processor that performs a Retinex-like process on the first luma component using surround function values to provide a Retinex-like processed first luma component;
a summing device that adds the Retinex-like processed first luma component and the second luma component so that a resulting luma component can either be bigger or smaller than the luma component of the image signal, and adding the resulting luma component and the chroma component to provide a processed image signal.

9. The method of claim 8, further comprising an averaging module that averages at least some of the image pixels of the first luma component over a plurality of image pixels of the first luma component to provide a plurality of surround function values.

10. The apparatus of claim 9, wherein the averaging module comprises:
a summing device that sums N values of the image pixels of the first luma component to provide a summed result; and
a divider module that divides the summed result by N.

11. The apparatus of claim 9, wherein the averaging module is configured to average the image pixels of the first luma component over a block of image pixels of the first luma component.

12. The apparatus of claim 11, wherein the averaging module is configured to average the image pixels over varying sized blocks of image pixels of the first luma component.

13. The apparatus of claim 11, wherein the averaging module is configured to average the image pixels over a 128×128 sized pixel image box.

14. A processor readable non-transitory storage product encoded with instructions operable to cause the processor to:
separate a luma component and a chroma component from an image signal to provide the luma component and the chroma component;
split the luma component of the image signal into first luma component and a second luma component;
perform Retinex-like processing using surround function values to provide a Retinex-like processed first luma component; and
add the Retinex-like processed first luma component and the second luma component, so that a resulting luma component can either be bigger or smaller than the luma component of the image signal, and adding the resulting luma component and the chroma component of the image signal to provide a processed image signal.

15. The product of claim 14, further comprising instructions operable to cause the processor to average at least some of the image pixels of the first luma component over a plurality of image pixels of the first luma component to provide a plurality of surround function values.

16. The product of claim 15, further comprising instructions operable to cause the processor to:
sum N values of the image pixels of the first luma component to provide a summed result; and
divide the summed result by N to provide the average surround function values.

17. The product of claim 14, further comprising instructions operable to cause the processor to not modify the chroma component of the image signal.

18. The product of claim 15, further comprising instructions operable to cause the processor to average the image pixels over a block of image pixels of the first luma component.

19. The product of claim 18, further comprising instructions operable to cause the processor to average the image pixels over varying sized blocks of image pixels of the first luma component.

20. The product of claim 18, further comprising instructions operable to cause the processor to average the image pixels over a 128×128 sized block.

* * * * *